SCREENED ELECTROMAGNETIC FLOWMETER

Original Filed July 25, 1966 6 Sheets-Sheet 1

INVENTOR
Vincent J. Cushing
BY Shoemaker and Mattare
ATTORNEYS

SCREENED ELECTROMAGNETIC FLOWMETER

Original Filed July 25, 1966 6 Sheets-Sheet 2

INVENTOR

Vincent J. Cushing

BY Shoemaker and Mattare

ATTORNEYS

SCREENED ELECTROMAGNETIC FLOWMETER

Original Filed July 25, 1966 6 Sheets-Sheet 5

INVENTOR

Vincent J. Cushing

BY Shalmakwand Mattare

ATTORNEYS

SCREENED ELECTROMAGNETIC FLOWMETER

Original Filed July 25, 1966 6 Sheets-Sheet 4

INVENTOR
Vincent J. Cushing

BY Shoemaker and Mattare

ATTORNEYS

SCREENED ELECTROMAGNETIC FLOWMETER

Original Filed July 25, 1966 6 Sheets-Sheet 5

INVENTOR
Vincent J. Cushing

BY Shoemaker and Mattare

ATTORNEYS

SCREENED ELECTROMAGNETIC FLOWMETER

Original Filed July 25, 1966 6 Sheets-Sheet 6

INVENTOR
Vincent J. Cushing

BY Shoemaker and Mattare

ATTORNEYS

United States Patent Office

Re. 26,797
Reissued Feb. 17, 1970

26,797

SCREENED ELECTROMAGNETIC FLOWMETER

Vincent J. Cushing, 9804 Hillridge Drive,
Kensington, Md. 20795

Original No. 3,329,020, dated July 4, 1967, Ser. No. 567,419, July 25, 1966. Application for reissue Feb. 23, 1968, Ser. No. 710,438
Int. Cl. G01f *1/00*
U.S. Cl. 73—194 21 Claims

Matter enclosed in heavy brackets [ ] appears in the original patent but forms no part of this reissue specification; matter printed in italics indicates the additions made by reissue.

*ABSTRACT OF THE DISCLOSURE*

*A tubular means is provided along with means for producing a magnetic field within the tubular means. At least two separate detecting electrodes are insulated from one another and are disposed adjacent the tubular means, one of these electrodes being a relatively high impedance electrode. A screen surface includes a screen electrode means and said high impedance detecting electrode, the screen surface being substantially closed peripherally thereof and including a plurality of electrically nonconductive gaps, this screen electrode being in surrounding relationship to the axis of the tubular means. Each electrode means of the screen surface has a potential thereon which is a linear function of the electrical potential on the detecting electrode.*

The present application is a continuation-in-part of United States patent application Ser. No. 449,930, filed Apr. 14, 1965, now Patent No. 3,274,831, which in turn was a continuation-in-part of United States patent application Ser. No. 181,274, filed Mar. 21, 1962, now abandoned.

The present invention relates to an electromagnetic flowmeter, and more particularly to a flowmeter which may be effective employed with both electrically conductive metered fluids, as well as dielectric metered fluids. Prior art electromagnetic flowmeters have been operable only with fluids having a relatively high electrical conductivity, and known instruments have not been successfully operated with dielectric or low-conductivity fluids. In such prior art structures, the flowmeter's calibration factor D, that is the ratio of flow-generated voltage divided by flow rate, is independent of the electrical conductivity of the metered fluid only if the electrical conductivity of the metered fluid is large compared with the electrical conductivity of the conduit or pipe means defining the flow path through the device.

Accordingly, existing electromagnetic flowmeters provide dielectric pipes which are adapted to form the flow path through which the metered fluid passes, and in those cases where a metallic pipe such as steel or the like is employed, a dielectric liner is utilized to separate the metered fluid from the conductive pipe. In any event, it has been necessary to provide an arrangement wherein the material forming the flow path and which is in surrounding relationship to the metered fluid have an electrical conductivity which is low compared with the conductivity of the fluid, a dielectric material usually being employed for this purpose.

The above comments can be usefully generalized to cover conductive as well as dielectric fluids and conductive as well as dielectric flow path defining means within the flowmeter. It can be said that an electromagnetic flowmeter's calibration factor D will be insensitive to the electrical characteristics (the electrical conductivity $\sigma$ and the relative permittivity K) of the metered fluid only if the complex conductivity $S_1$ of the metered fluid is large compared with the complex conductivity $S_2$ of the flow path defining means. The complex conductivity S is defined as the ratio of electric field E divided by the current density j, i.e., $S=E/j=\sigma+i\omega KK_0$ where $\omega$ is the angular frequency of the electric field and $K_0$ is the permittivity of free space, 8.85 picofarads per meter. Since $S_1$ and $S_2$ are complex numbers as used in electrical practice, we mean by "large" that the magnitude of $S_1$ is large compared with the magnitude of $S_2$, i.e., $|S_1|>>|S_2|$.

If $S_1$ is not sufficiently large relative to $S_2$, then the electromagnetic flowmeter's calibration factor D depends on the electrical characteristics of both the metered fluid and the flow path defining means. For utility, this calibration factor must be substantially insensitive to the electrical characteristics of the metered fluid.

Dielectric fluids have not heretofore been successfully metered by electromagnetic means because the complex conductivity thereof is comparable and in many instances considerably smaller than the complex conductivity of the materials which are used for the fluid flow path defining means.

The difficulty, then, is that the electromagnetic flowmeter's calibration factor D is generally dependent on the electrical characteristics of both the metered fluid and the flow path defining means. This dependence is inconsequential if the complex conductivity of the metered fluid is sufficiently large compared with the complex conductivity of the flow path defining means, but the dependence is deleterious and disabling when the complex conductivity of the metered fluid is comparable to or perhaps smaller than the complex conductivity of the flow path defining means.

An important feature of the present invention is the provision of an electrically conductive screen surface extending in surrounding spaced relationship to the longitudinal axis of the tubular means through which the metered fluid flows, this screen surface being disposed either inwardly or outwardly of such tubular means as hereinafter fully explained. This screen means ensures that the calibration factor D of the flowmeter is independent of the electrical characteristics of materials exterior of the screen surface. In this manner, changes in the electrical characteristics of portions of the flowmeter or other components adjacent thereto exterior of the screen surface will not affect proper operation of the apparatus. Where this effective screen surface is provided, the calibration factor of the flowmeter can also be made to be insensitive to the electrical characteristics of the metered fluid. The invention apparatus can thereby be effectively operated with electrically conductive as well as dielectric metered fluids.

The electrically conductive screen surface provided in the present invention is substantially closed peripherally thereof, and comprises a plurality of electrode means. One particularly excellent construction is to provide this screen surface on the interior wall of the flow path defining means so that the screen surface separates the metered fluid from the surrounding tubular means. On the other hand, if it is necessary to protect the screen surface from the metered fluid which may be of a corrosive nature, a liner may be provided inwardly of the screen suface, this liner being of the thinnest possible construction so that the metered fluid is separated from the screen surface by an inconsequential thickness of liner material. With this arrangement, an electromagnetic flowmeter may be made, the calibration factor of which does not depend on the electrical characteristics of the metered fluid. It has also been found as explained hereinafter that in addition to effectively operating with a very thin liner, the flowmeter may be successfully operated where a relatively thick-walled tubular means is provided inwardly of the screen surface.

When such a so-called thick-walled tubular means is employed, the calibration factor D of the flowmeter once again becomes insensitive to electrical characteristics of the metered fluid.

Suitable electrical networks may be connected with the output of the transducer portions of the various forms of flowmeter according to the present invention, and by suitable adjustment of these networks, the flowmeter is adapted to provide an indication of volumetric flow rate, or optionally, for non-polar fluids, the flowmeter can provide an indication of mass flow rate.

An object of the present invention is to provide a new and novel electromagnetic flowmeter which is adapted to be effectively employed with both electrically conductive metered fluids, as well as dielectric metered fluids.

Another object of the invention is the provision of an electromagnetic flowmeter, the calibration factor of which is independent of the electrical characteristics of materials outwardly of a screen surface provided in the flowmeter.

A further object of the invention is to provide an electromagnetic flowmeter which is also insensitive to the electrical characteristics of the metered fluid when the screen surface is in direct contact with the metered fluid; when a very thin liner is employed inwardly of the screen surface; and further when a relatively thick-walled tubular means is provided inwardly of the screen surface.

A still further object of the invention is to provide an electromagnetic flowmeter which is quite simple and inexpensive in construction, is relatively lightweight and of small size, and which at the same time is quite efficient and reliable in operation.

Other objects and many attendant advantages of the invention will become more apparent when considered in connection with the specification and accompanying drawings, wherein.

Figure 1:
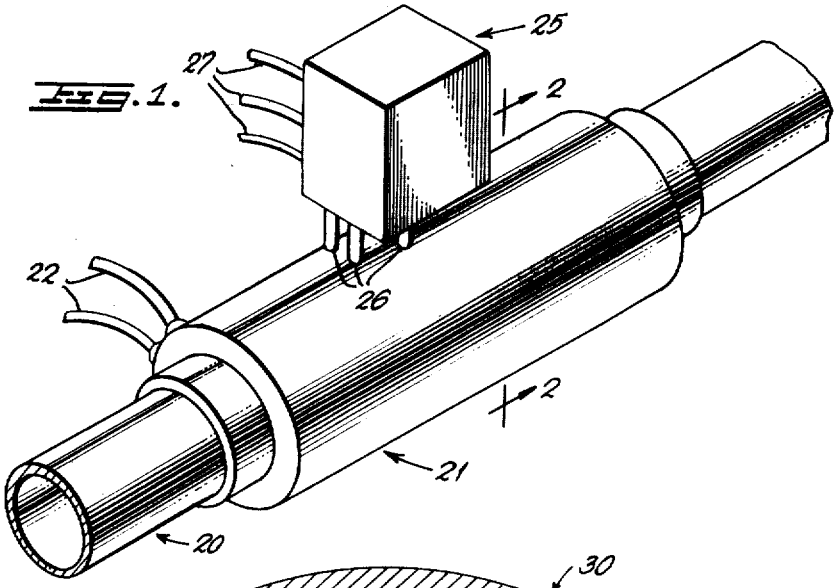
FIG. 1 is a perspective view of a fluid line having incorporated therein the magnetic flowmeter apparatus of the present invention.

Referring now to the drawings wherein like reference characters designate corresponding parts throughout the several views, FIGS. 1–8 inclusive illustrate the transducer portion of a first form of the invention, and as seen in FIG. 1, a fluid line is indicated generally by reference numeral 20, through which a fluid is adapted to flow, the transducer portion of the magnetic flowmeter apparatus being indicated generally by reference numeral 21, it being apparent that this portion of the invention is connected in the fluid line such that all of the fluid will flow therethrough.

A pair of leads 22 extend outwardly of the transducer portion and are connected with a suitable generator such as a power oscillator which is adapted to energize the magnet coil windings hereinafter described at a suitable frequency.

Some of the electrical components of the electrical network of the system are disposed within a suitable housing 25, which is supported from the transducer portion by a plurality of supporting legs 26, a plurality of leads 27 extending outwardly from the network and being connected with a suitable source of power and remaining portions of the associated electrical network.

Figure 2:
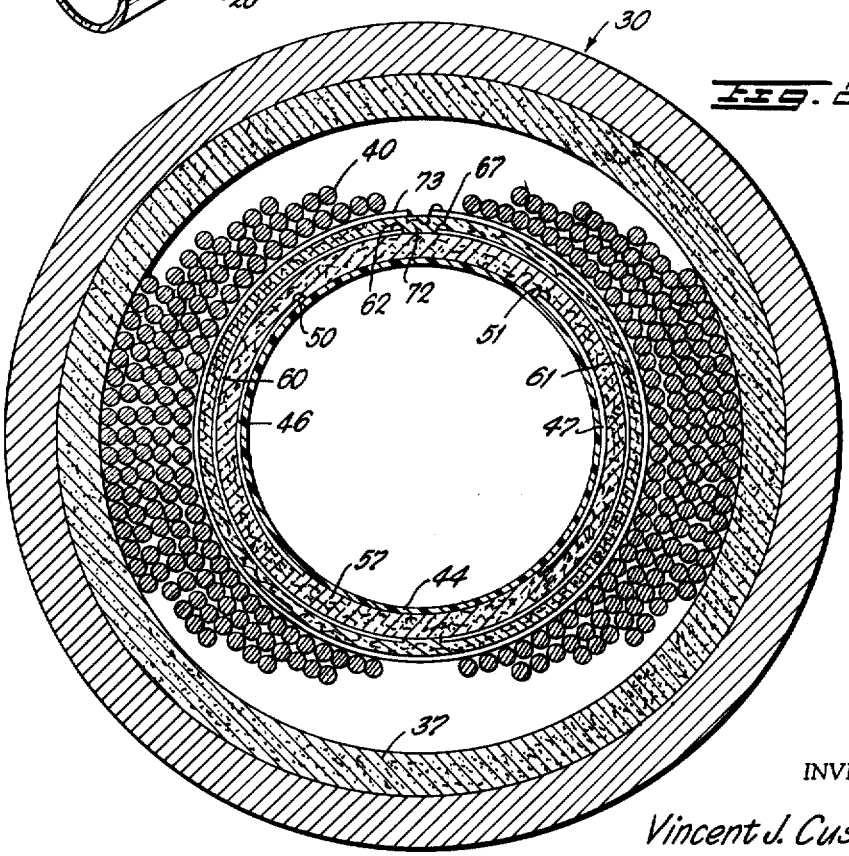
FIG. 2 is a cross-sectional view taken substantially along line 2—2 of FIG. 1 looking in the direction of the arrows.
Figure 3:
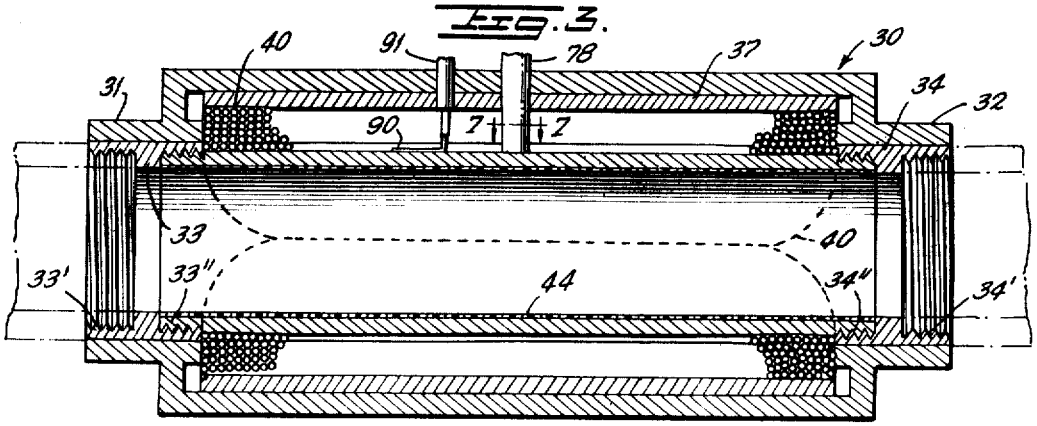
FIG. 3 is a longitudinal section taken through the apparatus shown in FIG. 1 of the drawings.

Referring now to FIGS. 2 and 3, an outermost casing 30 is substantially cylindrical in configuration and is hollow throughout, a pair of annular flanges 31 and 32 extending from opposite ends thereof to facilitate connection with the fluid line. In order to make such connection, a pair of fittings 33 and 34 are positioned within flanges 31 and 32 respectively, these fittings having a first pair of screw threads 33' and 34' adapted to receive a suitable threaded end portion of the fluid line, second threaded portions 33'' and 34'' being provided for supporting the intermediate structure as hereinafter described.

Casing 30 is formed of a suitable conductive and/or magnetic substance such as aluminum, and immediately inwardly of the aluminum casing there is provided a cylindrical body 37 formed of magnetic material. In a typical example, the cylindrical body 37 may be formed of powdered iron which has a high degree of permeability which is well known.

Disposed inwardly of the body 37 is the magnet coil winding 40, this coil winding as seen most clearly in FIG. 2 consisting of a plurality of individual wires which extend parallel with the pipe, the wires being turned and extending transversely of the longitudinal axis of the apparatus at opposite ends of the coil winding as will be more readily apparent in FIG. 3.

An inspection of the cross-sectional shape of the winding as seen in FIG. 2 reveals that it is of varying thickness, the coil having its maximum thickness along a horizontal line extending through the center of the apparatus as seen in FIG. 2, and the winding having a minimum thickness along a vertical line extending through the apparatus as seen in FIG. 2. In fact, it will be noted that the magnet winding tapers from a maximum thickness to a point where the magnet winding is actually of zero thickness along the vertical line discussed in connection with FIG. 2.

This particular configuration of the magnet coil winding is of a relatively conventional construction and is commonly called a cosine magnet configuration. This type of configuration provides a substantially uniform magnetic field within the central pipe of the apparatus, and provides an economical and compact construction. The magnetic induction lines extend vertically in this figure.

The liner through which the metered fluid flows in the present invention is indicated by reference numeral 44 and may be formed of a suitable dielectric material such as Teflon or the like. This inner liner should be of the thinnest possible construction, and a thickness of 0.010 to 0.030 inch is considered to be a practical thickness for this member. In this figure, the fluid flow is perpendicular to the plane of the figure.

A plurality of detecting electrodes are provided outwardly of liner 44 and are preferably supported on the outer surface thereof. The detecting electrodes are shown as two in number, and are indicated by reference numerals 46 and 47. These detecting electrodes are, of course, formed of an electrically conductive material and are preferably disposed substantially diametrically opposite to one another. In general, the detecting electrodes of the present invention include at least two separate electrodes which are electrically insulated from one another and which are disposed substantially symmetrically on opposite sides of a plane disposed substantially parallel with the magnetic field and substantially passing through the center of the tubular means or pipe through which the fluid flows.

Detecting electrodes 46 and 47 have been described and illustrated as being supported on the outer surface of liner 44. It should be understood that in certain instances wherein the material of the electrodes is physically and chemically compatible with the fluid flowing through the apparatus, the detecting electrodes may be supported on the inner surface of the fluid path defining means in direct contact with the fluid.

Each of the detecting electrodes extends through an arc of substantially 100°. It will be understood that the arcuate extent of the detecting electrodes may be varied in accordance with different operating conditions, but in any event, the detecting electrodes should extend through a substantial arc so as to provide the desired relative large area. It is, of course, apparent that the detecting electrodes are of curved cross-sectional configuration as clearly seen in FIG. 2. It should be noted that while the tubular means in the various forms of the present invention has been illustrated as being of circular cross-section, they may also be of other than circular cross-sectional configuration, the detecting electrodes in general being of a complementary configuration so as to form a compact structure.

Figure 4:
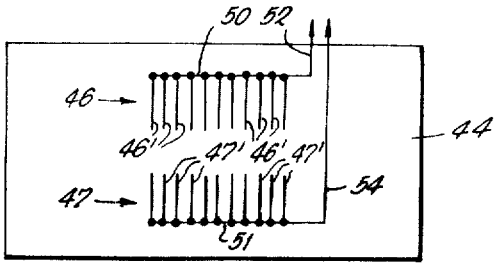
FIG. 4 is a somewhat schematic flattened view of the exterior surface of the pipe through which the fluid flows illustrating the arrangement of the detecting electrodes.

Referring to FIG. 4, a somewhat schematic illustration of liner 44 in a flattened position is provided. As seen in this figure, detecting electrode 46 comprises a plurality of electrically conductive portions 46', which are of elongated configuration and are spaced a substantial distance from one another so as to be electrically insulated from one another. These electrically insulated portions are in turn connected with one another only at the upper ends thereof as seen in this figure by a common connector means 50, this common connector or bus bar means 50 being seen also in FIG. 2.

In a similar manner, detecting electrode 47 as seen in FIG. 4 is composed of a plurality of elongated electrically conductive portions 47' which are spaced from one another and which in turn are connected only at the lower ends thereof as seen in this figure by means of a common conductor 51. This common conductor or bus bar means 51 can also be seen in FIG. 2.

It will be seen that with this type of construction, the detecting electrodes cover a relatively wide area of the device, and yet at the same time, the construction is such that the alternating magnetic field will not set up appreciable eddy currents which would cause a deleterious change in the magnitude as well as the direction of the desired uniform magnetic induction.

Figure 12:
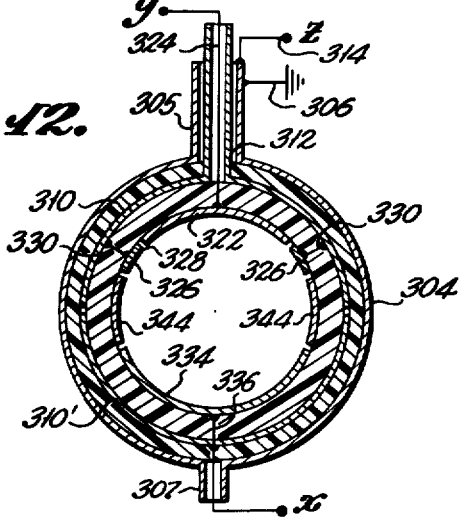
FIG. 12 is a sectional view taken substantially along line 12—12 of FIG. 11 looking in the direction of the arrows.

A first lead 52 is illustrated somewhat schematically in FIG. 4, as being connected to bus bar means 50, this lead as seen in FIG. 12 extending around the outer periphery of pipe 44 and providing a connection with a lead 53 which extends outwardly of the casing as hereinafter more fully described.

A lead 54 is indicated schematically in FIG. 4 as connected to bus bar means 51, this lead as seen in FIG. 12 extending around the outer periphery of the liner 44 and being connected with a lead 55 which extends outwardly of the casing as hereinafter more fully described.

The construction as shown in FIG. 4 may be manufactured in a number of different manners. For example, the cylindrical liner 44 may be mounted on a mandrel and then provided with a plurality of circumferentially extending grooves within which conducting wires may be disposed. These conducting wires may then be milled off in a longitudinal direction to provide the desired circumferential dimension of the conducting wires. These wires wires will then represent the conductive portions 46' and 47' as shown in FIG. 4.

The bus bar means 50 and 51 may comprise a pair of wires suitably connected with the conductive portions and lying within longitudinally extending grooves.

Leads 52 and 54 may, of course, comprise conventional wires connected with bus bar means 50 and 51 respectively.

Alternatively, the construction as shown in FIG. 4 may be provided by first providing a relatively thin layer of electrically conductive material such as foil about the tube or forming an electrically conductive layer of vapor-deposition. The conductive portions and the bus bar means may then be formed by utilizing printed circuit techniques, by etching or by engraving. The spacing of the conductive portions will depend on the desired operating characteristics, the spacing in any event being such that it does not cause excessive disturbances or attenation of the magnetic field.

Referring again to FIG. 2, a tubular means in the form of a body of suitable insulating material 57 is provided, this body being fiberglass or similar material which has the necessary dielectric and magnetic properties even at cryogenic temperatures. The material should have a large Young's modulus and the thermal coefficient of expansion in the negihborhood of the operating temperatures should be low.

A pair of screen electrode means or shield means 60 and 61 are provided, these shield means each being formed of electrically conductive material and being substantially curvilinear in configuration as seen in FIG. 2. The shield means 60 and 61 are disposed outwardly of and adjacent to detecting electrodes 46 and 47 and the shield means extend through a greater arc than the adjacent electrodes. The shield means 60 and 61 coactively subtend substantially a full 360°, except for two small gaps at diametrically opposite points, these gaps extending longitudinally throughout the length of the shield means to prevent short circuiting of the two shield means. Members 60 and 61 thereby define a screen surface disposed in surrounding spaced relationship to the longitudinal axis extending through the flowmeter, this screen surface being substantially closed peripherally thereof and including the two electrically non-conductive gaps of only minor peripherally extending dimension sufficient to insulate the two portions of the screen surface from one another. The shield means is disposed directly radially outwardly of the associated detecting electrodes, and is disposed outwardly of the electrodes with respect to the aforesaid plane which is disposed substantially parallel with the magnetic field and substantially passes through the center of the tubular means, the shield means being disposed outwardly of the detecting electrodes with respect to said plane and along lines extending perpendicular from the plane and passing through the detecting electrodes.

In the present invention, the screen surface provided in each form of the invention comprises a substantially peripherally closed surface with each point on said screen surface having a potential established thereon by an associated electrical network hereinafter described, which is a linear function of the potentials on the two detecting electrodes.

If $e_1$ and $e_2$ are the potentials on the two detecting electrodes, the potential e at each point on the screen surface is a linear function of $e_1$ and $e_2$ if $e=ae_1+be_2+c$, where a, b and c are constants. In practice, these constants are established by adjustment of the associated electrical network. It should be noted that, in general, this definition of linear function contemplates that the constants may be complex numbers (as they are generally used in electrical practice) including zero. If hum in a flow meter were no problem the constant c would be set equal to zero.

This screen surface ensures that potentials developed inwardly of the screen surface are insenitive to the electrical characteristics of the materials outwardly thereof. The material of the screen surface means should be such that its potential can be determined substantially everywhere, and yet it must be such that the alternating magnetic induction does not generate excessive eddy currents. Accordingly, the construction of the shield means may be similar to that of the detecting electrodes.

Figure 5:
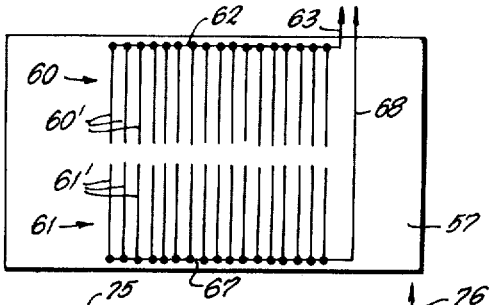
FIG. 5 is a somewhat schematic flattened out view of a portion of the insulating body surrounding the pipe showing the arrangement of the shield means.

Referring to FIG. 5, the body 57 is shown somewhat schematically in a flattened position, and it will be noted that shield means 60 includes a plurality of electrically conductive portions 60' which are spaced from and electrically insulated from one another, and which are joined at the upper portions thereof by a common conductor or bus bar means 62.

Figure 8:
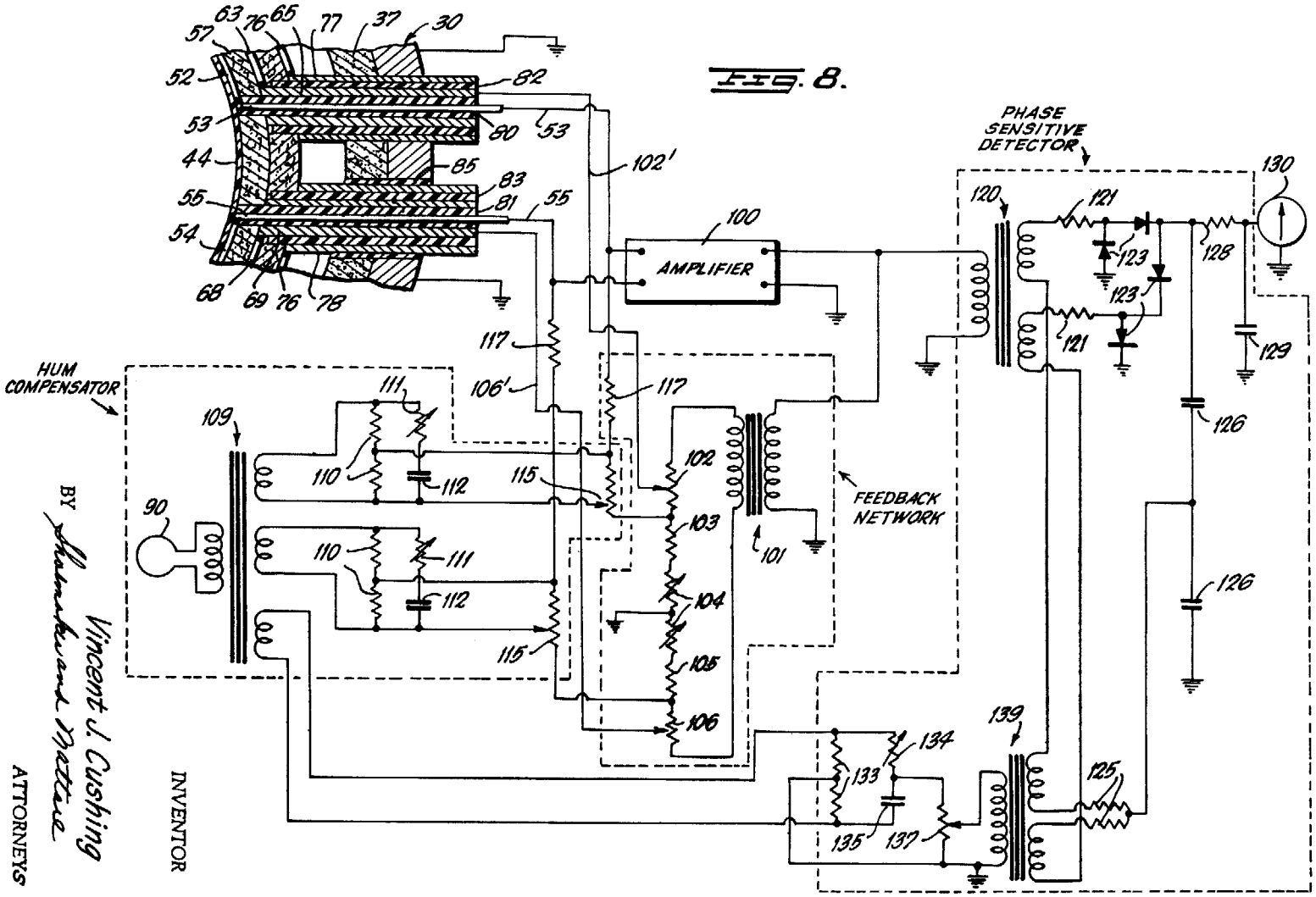
FIG. 8 is a schematic wiring diagram of the electrical network employed with the transducer means illustrated in FIGS. 1 through 7.

A lead indicated schematically by reference numeral 63 is connected with bus bar means 62, and as seen in FIG. 8, lead 63 extends around to a point where it is connected with a tubular conductor 65, hereinafter more fully described.

Shield means 61 comprises a plurality of electrically conductive portions 61' which are spaced from and electrically insulated from one another and which are connected to one another at the lower portions thereof as seen in FIG. 5 by means of a common conductor or bus bar means 67. A lead is indicated schematically at 68, this lead being connected to bus bar means 67 and as seen in FIG. 8, this lead 68 extends around body 57 and is connected with a tubular conductor 69 which will be hereinafter more fully described.

It will be noted that not only does the shield means extend through a greater circumferential arc or peripheral dimension than does the detecting electrodes, but in addition, the shield means extends longitudinally beyond opposite ends of the detecting electrodes or both upstream and downstream thereof such that the detecting electrodes are effectively encompassed by and protected by the shield means so that the detecting electrodes are effectively isolated from outside electrical interference.

Figure 6:
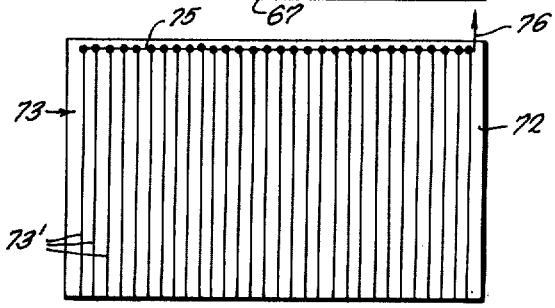
FIG. 6 is a somewhat schematic flattened out view of the body of insulating material surrounding the pipe illustrating the arrangement of the ground means.

Referring again to FIG. 2, a body 72 of insulating material such as fiberglass is disposed in surrounding relationship to the shield means, and a ground means 73 is mounted on the outer surface of body 72. As seen in FIG. 6, ground means 73 includes a plurality of electrically conductive portions 73' which are spaced from and insulated from one another, the upper ends of these conductive portions being connected by a common conductor or bus bar means 75.

A lead 76 is connected with bus bar means 75, lead 76 being connected with tubular conductors 77 and 78 hereinafter more fully described. It will, of course, be understood that ground means 73 may be manufactured in the same manner as the detecting electrodes previously described.

It should also be noted that the bodies of insulating material 57 and 72 may either be separate or part of an integral and homogeneous structure, the bodies in any event serving to provide the proper spacing and electrical insulation between the detecting electrodes, the shield means and the ground means.

As seen in FIG. 2, the ground means 73 extends through an arc of nearly 360°, the opposite ends of the ground means being spaced from one another by a small gap so as not to form a complete loop which might result in eddy current losses.

While the detecting electrodes, shield means and ground means have been each shown as constructed as a grid-like means, it will be understood that various other constructions, such as a laminated arrangement, may be employed, as long as an arrangement is provided which incorporates insulated portions the major parts of which are insulated from one another and which portions are connected to one another at certain points. It is further noted that the detecting electrodes, shield means and ground means may as well be formed of sufficiently thin conductive sheets of material such as foil and the like whereby the same desired end results may be obtained.

Referring to FIG. 8, it will be seen that leads 53 and 55 extend outwardly of the casing and are surrounded by tubular insulating sleeves 80 and 81 respectively. These insulating sleeves are in turn surrounded by tubular conductors 65 and 69. These tubular conductors are then in turn surrounded by insulating sleeves 82 and 83 respectively which are further surrounded by tubular conductors 77 and 78 respectively.

This arrangement may be considered a triaxial conductor arrangement, wherein the conductors 53 and 55 from the detecting electrodes are shielded by the tubular shield members 65 and 69, preferably to a point as close to the electrical network as is feasible.

The tubular members 77 and 78 serve as ground shields for the arrangement to a point as close as possible to the electrical network to minimize the effects of any outside electrical disturbances. It will be noted that tubular member 78 is insulated by a tubular insulating member 85 from the casing 30, while tubular member 77 is connected with the casing 30 which in turn is connected with ground.

Figure 7:
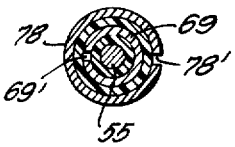
FIG. 7 is a cross-sectional view taken substantially along line 7—7 of FIG. 3 looking in the direction of the arrows.

As seen in FIG. 7, tubular member 69 is preferably provided with a longitudinally extending slot 69' so as to prevent this tubular member from providing a closed loop, thereby minimizing eddy current losses. Tubular member 78 is provided with a longitudinally extending slot 78' for a similar purpose. It will be noted that these slots 69' and 78' are disposed 180° apart so as to provide the maximum shielding benefit. It will be understood that tubular members 65 and 77 are provided with longitudinally extending slots in the same manner as are tubular members 69 and 78 respectively.

As seen in FIG. 3, a magnetic sensing means in the form of a loop 90 of electrically conductive material such as copper is provided, this magnetic sensing loop being disposed outwardly of body 72 and adjacent to the inner portion of the magnet winding so as to sense variations in the magnetic field. Loop 90 extends outwardly of the casing and is surrounded by a tubular insulating member 91.

It will be noted that the outermost body of insulating material is provided with screw threads at opposite ends thereof which are received in threaded portions 33'' and 34'' of fittings 33 and 34, thereby permitting the apparatus to be readily assembled and disassembled.

Referring now to FIG. 8, an amplifier 100 is provided, and it will be noted that leads 53 and 55 connected to the detecting electrodes are connected with the input of the amplifier. The amplifier may be a 4-stage negative feedback amplifier of the type having a differential first-stage input, the amplifier converting the input to a single-sided signal and accordingly, the amplifier is depicted as having a single-sided output.

The first amplifier stage is preferably placed as close as possible to the transducer portion of the apparatus, and will be placed within the housing 25 previously described so as to make the leads as short as possible. The additional three amplifier stages as well as the detection, display and control equipment may be placed at a distance from the transducer portion as is convenient. All wiring between the two locations, of course, should be well shielded.

Various forms of amplifying means may be employed in the prevent invention, and the above-described amplifier is a typical example. The magnetic means may be operated at any convenient frequency such as 60 cycles per second which is readily available and suitable for commercial purposes. A high frequency on the order of 10 kilocycles per second is suitable for a very rapid response flowmeter.

The output of the amplifier is connected with the primary of a transformer 101, connected in a feedback network indicated by the dotted line so labeled. The secondary of this transformer is connected in series with a potentiometer 102, a resistor 103, ganged rheostats 104, a resistor 105, and a potentiometer 106. Transformer 101 is required since the output of the amplifier is single-sided, whereas the input is push-pull or differential in character, and the transformer 101 serves to convert the single-sided output signal into a push-pull signal for use in the feedback network.

A hum compensator indicated by the dotted line so labeled includes the magnetic sensing loop 90 previously described, this hum compensator being utilized to generate a voltage of equal magnitude but opposite phase to the so-called "transformer effect" hum generated in the sensing circuit. This hum is proportional to the magnitude and frequency of the magnetic field and is independent of flow rate.

A voltage generated by the hum compensator is injected into the input of the amplifier so as to cancel the unwanted hum signal.

The voltage generated in magnetic sensing loop 90 is directly proportional to the magnitude and frequency of the magnetic field. Sensing loop 90 is connected with the primary of transformer 109 which serves to isolate electrically the magnetic sensing loop from the remainder of the circuitry.

The voltage generated by the magnetic sensing loop must be adjusted to the proper amplitude and phase before being injected into the input of the amplifier. The phase shifting is accomplished in a conventional manner by means of the phase-shifting networks connected with the two upper windings of the secondary of transformer 109 as seen in FIG. 8 and consisting of fixed capacitors 112. The magnitude of the signal to be injected into the input of the amplifier is controlled by means of potentiometers 115.

In order to maintain amplitude stability of the amplifier, a considerable amount of feedback is required. Resistors 103 and 105 determine the amount of feedback in the amplifier, thereby effecting the net gain of the amplifier and the ganged rheostats 104 enable the electrical balancing of the differential amplifier with respect to ground. Resistors 117 are grid-leak resistors from the first stage of the differential amplifier, and resistors 117 must be maintained at a large value in order to provide a high input impedance amplifier.

The voltage applied to the shield means may be adjusted by means of potentiometers 102 and 106, these potentiometers being connected by means of leads 102' and 106' with tubular connectors 65 and 69 respectively which are in turn connected with the shield means. This arrangement enables the shield means to be driven at a voltage substantially the same as the signal voltage on the detecting electrodes, and preferably the shield means are driven at precisely the same voltage as the associated detecting electrodes.

As mentioned previously, the screen surface of the present invention is substantially peripherally continuous except for small gaps required to prevent mutual short-circuiting between adjacent portions of the screen surface which are maintained at different potentials. The shield means 60 and 61 define the screen surface of this form of the invention.

It is well known in electrical practice that we can measure terminal voltage in a generator such as in an electromagnetic flowmeter, provided the external load such as the associated electrical network is high impedance. In fact, the load impedance must be many times higher than the generator's internal impedance of accuracy. Therefore, of the two terminals of the associated electrical network which are connected to the two detecting electrodes, at least one of the terminals must have a high input impedance. As the term is employed in this case, a detecting electrode which is electrically connected to a high input impedance terminal of the associated electrical network is called a high impedance detecting electrode. As illustrated in this first modification, each of detecting electrodes 46 and 47 is a high impedance electrode, and the electrical network associated with these electrodes ensures that the portion of the screen surface adjacent to the high impedance electrodes is at substantially the same flow generated electrical potential as the high impedance electrodes. That is to say, electrodes 46 and 60 are at substantially the same electrical potential and electrodes 47 and 61 are substantially the same electrical potential during operation of the apparatus.

The phase-sensitive detector indicated by the dotted line so labeled is connected with the secondary of a transformer 120, the primary of this transformer being connected with the output of amplifier 100. The phase-sensitive detector includes a pair of resistors 121 interconnected with a plurality of diodes 123, this connection being of a conventional nature so as to be sensitive only to the flow induced voltage. Since the undesirable "transformer effect" hum is electrically in quadrature with the flow induced voltage, the hum will not be detected in the phase-sensitive detector.

Resistors 125 similarly apply the reference phase voltage to the plurality of diodes 123 through the coupling capacitors 126. Resistor 128 and capacitor 129 determine the time constant of the phase-sensitive detector, and provide an output voltage to actuate some sort of indicating means, such as a voltmeter indicated by reference numeral 130.

The lowest winding of the secondary of transformer 109 ideally has a voltage which is in quadrature with the alternating magnetic field. For proper performance of the phase-sensitive detector, it is necessary to have a voltage which is in phase with the alternating magnetic field. Accordingly, the lowest winding of the secondary of the transformer 109 is connected with a phase shift network including fixed resistors 133, variable resistor or rheostat 134 and a fixed capacitor 135. The output of this phase shift is connected with a potentiometer 137 which is connected with the primary of a transformer 139, the secondary of which is connected with the aforedescribed phase-sensitive detector circuitry.

It will be noted that the magnetic sensing means accordingly serves to control the feedback of the shield means and also serves to control the operation of the phase-sensitive detector in accordance with variations of the alternating magnetic field.

Figure 9:
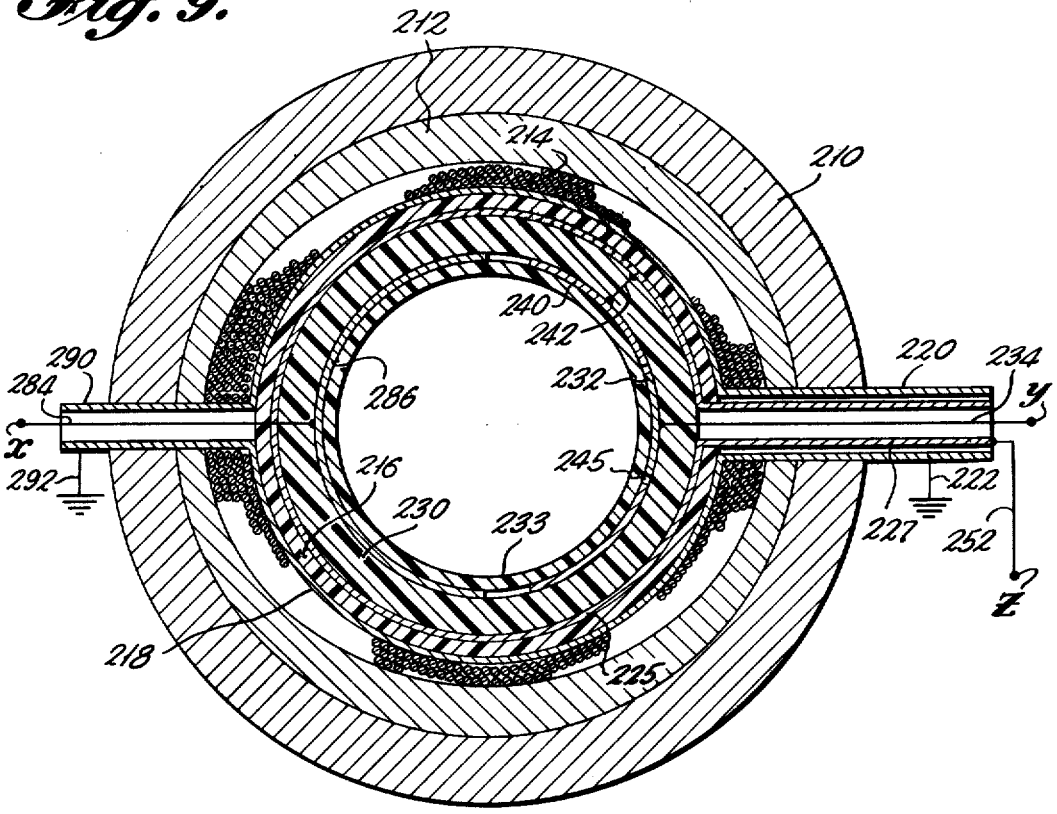
FIG. 9 is a schematic illustration of a modified flowmeter according to the present invention.
Figure 10:
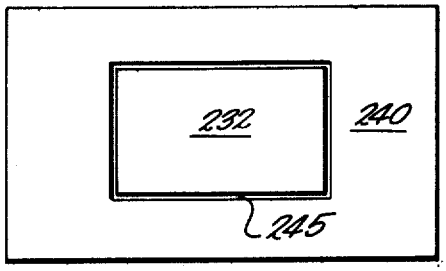
FIG. 10 is a view illustrating a detecting electrode and its associated guard ring means in its developed or planar form in the modification shown in FIG. 9.

Referring now particularly to FIGS. 9 and 10 of the drawings, a modified form of the invention is illustrated wherein an outer casing or enclosure 210 surrounds a body of magnetic permeable material 212, which in turn is disposed about the magnet winding 214. Members 210, 212 and 214 are similar to the corresponding portions described in connection with the previous modification, and it will be noted that the body of permeable material 212 may in this case be contoured to maintain the inner surface of the body of permeable material closely adjacent to the outer surface of the magnetic winding.

A tubular member 216 formed of suitable dielectric material such as fiberglass, plastic and the like supports a ground means 218 on the outer surface thereof, this ground means defining a substantially cylindrical configuration and preferably being formed either as a grid-work or as a thin metallic foil, as discussed hereinbefore. Ground means 218 is connected with a cylindrical conductive portion 220 which forms the outer portion of a triaxial transmission line, portion 220 being connected with ground through a lead 222.

The driven shield means is indicated by reference numeral 225, and is disposed between the inner surface of member 216 and the outer surface of member 230, this driven shield means being preferably formed as a thin sheet of metallic foil. The driven shield 225 is connected with the intermediate cylindrical portion 227 of the triaxial transmission line. Member 227 is connected by a lead 252 to terminal z.

A tubular member 230 formed of suitable dielectric material such as fiberglass or the like is disposed inwardly of the tubular member 216, with the driven shield means 225 interposed between the two tubular members 230 and 216. The detecting electrode means includes a relatively low impedance detecting electrode 286 and an opposed relatively high impedance detecting electrode 232 disposed at the inner surface of tubular member 230 and interposed between this tubular member and the liner means 233 formed of a suitable dielectric material. This liner is optional and is employed if the material of the electrodes is not chemically compatible with the metered fluid. In other words, the liner can be eliminated if desired where the electrodes and metered fluid are compatible.

Detecting electrode 232 is connected to a line 234 which forms the innermost portion of the triaxial transmission line. Line 234 is in turn connected with a terminal y.

A screen electrode or guard ring means 240 is interposed between tubular members 230 and 233, the guard ring means being connected with the driven shield means 225 through the intermediary of a lead 242. Referring now to FIG. 10, the developed or planar form of the detecting electrode 232 and the guard ring means 240 is illustrated. As seen in this figure, it will be noted that the detecting electrode 232 is substantially rectangular in configuration. The guard ring means 240 is also substantially rectangular and includes a central rectangular cutout portion which is slightly greater than the detecting electrode 232 so as to provide a clearance 245 all the way around the outer edges of the detecting electrode. Accordingly, when the two electrodes as seen in FIG. 10 are disposed in operative position, it will be understood that the guard ring means is disposed in spaced relationship with the detecting electrode and provides a substantially uniform spacing completely around the peripheral edge portions of the detecting electrode.

The relatively low impedance electrode 286 of the transducer may be formed either as a gridwork or as a sufficiently thin metallic foil as discussed hereinbefore. A tubular shield portion 290 is illustrated as being in surrounding relationship to lead 284 extending outwardly from electrode 286. This tubular shield portion is in turn connected by a lead 292 with ground. Lead 284 connects electrode 286 with a terminal x. As illustrated in FIG. 9, a single-sided configuration is provided, and it is preferable that the over-all angular and longitudinal dimensions of electrode 286 are substantially the same as electrodes 232 and 240 combined so that the electrodes 286, 232 and 240 provide a screen surface extending in surrounding spaced relationship to the longitudinal axis of the flowmeter and being substantially closed peripherally thereof and including a plurality of electrically non-conductive gaps of only minor peripherally extending dimension sufficient to insulate portions of this screen surface from one another. Here again, the potentials established on all points of the screen surface are a linear function of the potentials of the two detecting electrodes, the attendant electrical network associated with this transducer portion being described hereinafter.

Additionally, as illustrated in FIG. 9, the relatively high impedance detecting electrode 232 has the shield means 225 disposed outwardly thereof and subtending substantially a full 360°. This shield means is, therefore, a substantially closed surface, each point of which has a potential established thereon which is a linear function of the potentials on the detecting electrodes, and in fact, shield means 225 defines an equi-potential substantially closed surface.

A single-sided transducer configuration is illustrated in FIG. 9, and if it is desired to have a push-pull or symmetric configuration connected to a differential amplifier, then the left-hand electrode configuration in FIG. 9 would be symmetric with the right-hand configuration, and a second guard ring and second shield could be associated with the left-hand detecting electrode. Such a symmetric transducer configuration would also require a second attendant shielded transmission line.

As shown in FIG. 9, the two detecting electrodes 286 and 232, along with the associated guard ring 240 comprises a three-element screen surface. If desired, a larger number of elements or electrodes in the screen surface may be provided with an arrangement such that each such additional element is established at a potential which is a linear function of the potential on the two detecting electrodes. The associated electrical network is such as to provide a potential on the portion of the screen surface adjacent to the relatively high impedance electrode, namely, the guard ring 240, which is substantially the same as the flow generated electrical potential on the high impedance electrode.

It should be understood that in this modification as in the previously described modification, a portion of the screen surface defined by members 232, 240 and 286 and more particularly those portions defined by members 240 and 286 are disposed both upstream and downstream of the relatively high impedance electrode 232. In this modification, a portion of the screen surface is defined by the relatively high impedance electrode. It will also be noted that with the liner 233 in place, no portion of the fluid flowing through the flowmeter comes in contact with the portion of the screen surface which is substantially longitudinally coextensive with the relatively high impedance electrode.

Figure 11:
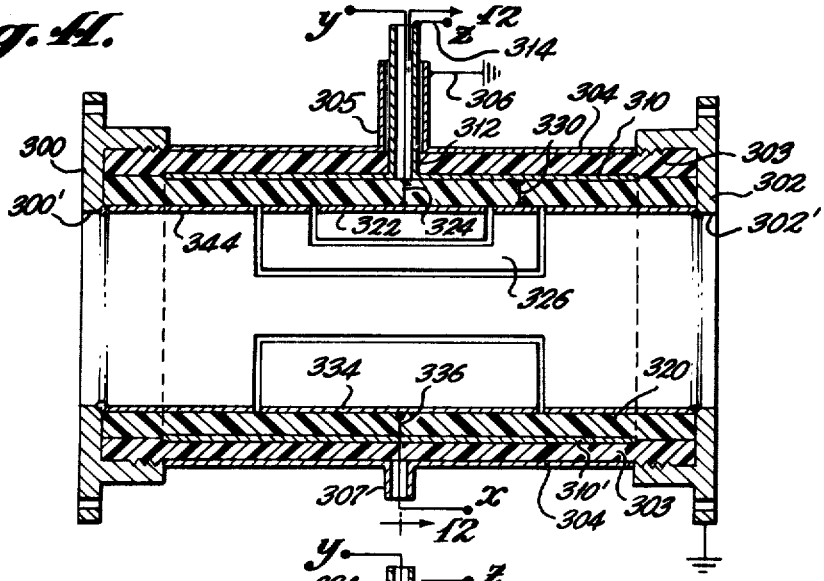
FIG. 11 is a somewhat schematic longitudinal section through a further modified form of the invention.
Figure 13:
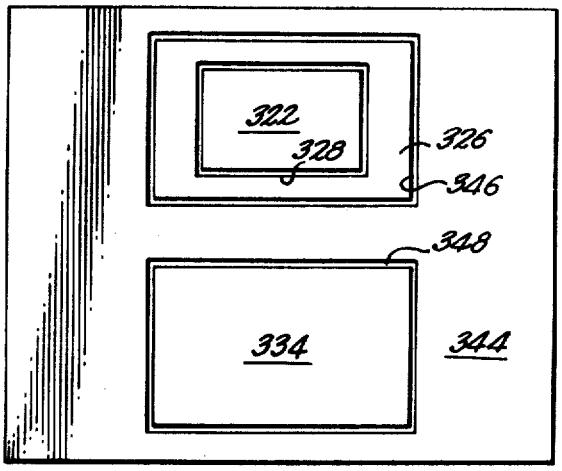
FIG. 13 is a view illustrating the detecting electrodes, the guard ring and the grounded screen electrode of the arrangement shown in FIGS. 11 and 12 in its developed or planar form.

Referring now to FIGS. 11–13 inclusive, a still further modified form of the invention is illustrated. As seen most clearly in FIG. 11, the transducer of this form of the apparatus includes a pair of opposite metallic end flanges 300 and 302 having suitable means for attachment to the associated conduit portions. These end flanges have central holes 300' and 302' respectively formed through the central portions thereof and defining a portion of the fluid flow path through the flowmeter. A first tubular member 303 formed of a suitable dielectric material such as fiberglass or the like is provided with threads on the outer surface thereof adjacent opposite end portions thereof for attachment to the end flanges. A ground shield means 304 is disposed peripherally about member 303 in a manner similar to the ground shield means previously described, this ground shield preferably being in the form of a thin layer of conductive material. This ground shield is connected at the upper portion thereof as seen in FIG. 11 with a tubular member 305 which in turn is connected by a lead 306 to ground. At the lower side of the figure, ground shield 304 is connected with a tubular member 307 surrounding a lead hereinafter described.

The ground shield 304 is mounted on the outer surface of member 303, and a shield means or screen electrode 310 is disposed at the inner surface of member 303. Shield means 310 is connected with a tubular member 312 disposed concentrically within tubular member 305, member 312 in turn being connected by a lead 314 with a terminal z. A tubular member 320 of fiberglass and the like is disposed concentrically within member 303, the shield means 310 being sandwiched between members 303 and 320.

A relatively high impedance detecting electrode 322 is disposed on the inner surface of member 320 and is connected with a lead 324 which extends coaxially within tubular member 312 previously described. Lead 324 serves to connect the relatively high impedance detecting electrode 322 with a terminal y.

A guard ring 326 is provided, and as seen in FIG. 13, the high impedance detecting electrode 322 is of substantially rectangular configuration, and the guard ring 326 is disposed in spaced surrounding relationship to the high impedance electrode and a small gap 328 separates the outer periphery of the detecting electrode 322 from the associated guard ring. Again referring to FIG. 11, it will be noted that the guard ring 326 is connected by a lead 330 with the shield means 310 previously described.

A relatively low impedance detecting electrode 334 is disposed in opposed relationship to detecting electrode 322, the low impedance detecting electrode being connected to a lead 336 extending coaxially within the tubular member 307 previously described. Lead 336 connects the low impedance detecting electrode with a terminal x. Lead 336 is also connected to a shield electrode 310' disposed symmetrically opposite to the aforementioned electrode 310 and separated therefrom by small insulating gaps.

A screen electrode 344 is provided, and as seen in FIG. 13, this screen electrode is disposed in surrounding relationship to the guard ring 326, there being a small insulating gap 346 between the guard ring and the shield electrode and extending completely peripherally about the guard ring. In a similar manner, the screen electrode 344 is spaced from the relatively low impedance detecting electrode 344, a small insulating gap 348 being disposed peripherally about the low impedance detecting electrode.

It will be noted as seen in FIG. 11 that portions of the guard ring 326 are disposed both upstream and downstream of the relatively high impedance detecting electrode 322, and that portions of the screen electrode 344 in turn extend even further upstream and downstream of the high impedance detecting electrode and its surrounding guard ring. The potentials on both the guard ring and the screen electrode are established by means of an associated electrical network at a potential which is a linear function of the potentials on the two detecting electrodes. In the case of the screen electrode 344, opposite ends of this screen electrode are illustrated as being electrically connected with the end flange 300 and 302 which are considered to be grounded. In this case, the potential on the screen electrode is a linear function of the two detecting electrodes, the proportionality constants being zero. If desired, the screen electrode 344 might be eliminated and the guard ring extended considerably further upstream and downstream of the high impedance detecting electrode and extending almost all the way to the end flanges, but being spaced slightly therefrom to avoid short circuiting, since these end flanges are considered to be grounded.

As illustrated, the magnetic induction is normal to the plane of FIG. 11, and the construction is shown as being without a liner so that the electrodes themselves define a portion of the fluid flow path through the flowmeter and are in direct contact with the metered fluid. As shown, the arrangement is single-sided, having one high impedance detecting electrode with an associated guard ring and shield means and having one low impedance detecting electrode. If a symmetrical balanced arrangement is desired, then the electrode arrangement shown at the bottom portion of FIG. 11 would be symmetric with that shown at the upper portion. The lower detecting electrode in such a case would have an associated guard ring and shield means and the two symmetric electrode arrangements would be connected with a symmetric differential amplifier which would in turn be the input to the associated electrical network.

It will be noted that in this arrangement a portion of the screen surface is defined by the relatively high impedance electrode, and a portion of the screen surface is disposed both upstream and downstream of the relatively high impedance electrode. The screen surface extends from a point adjacent one of the end portions of the tubular means of the transducer to a point adjacent the opposite end portion thereof, and portions of the screen surface which are substantially longitudinally coextensive with the relatively high impedance detecting electrode define a portion of the fluid flow path through the flowmeter and are in direct contact with the fluid passing through the flowmeter.

In the modifications shown in FIGS. 2 and 9, the flowmeter is provided with a liner separating the electrodes from the metered fluid. In these cases, the liner is of the thinnest possible construction, and in fact is eliminated if possible in order that the flowmeter's calibration factor D may be substantially independent of the electrical characteristics of the metered fluid. Where a liner is employed in the present invention, the screen surface is not in direct contact with the metered fluid.

If a liner is employed, it can be shown, in general that the flowmeter calibration factor D depends on the diameter of the flow conduit; the thickness of the dielectric liner; the electrical characteristics of the metered fluid; the electrical characteristics of the liner; and the amount of real and/or synthetic impedance directly connected across the external leads of the two detecting electrodes, as discussed hereinafter. The relative thickness of the liner is defined as the ratio of the liner thickness divided by the internal radius of the liner. It has been found that when the relative thickness of the liner exceeds a certain critical value so as to provide a so-called thick-walled liner as defined below, the electrical network of the flowmeter can be adjusted so that the calibration factor D again becomes insensitive to the electrical characteristics of the metered fluid.

Accordingly, a screened electromagnetic flowmeter according to the present invention may have the associated electrical network adjusted so that the flowmeter can effectively operate such that the calibration factor D is insensitive to the electrical characteristics of the metered fluid when the liner is either as thin as possible or completely absent, or when a so-called thick-walled liner is provided.

The flowmeter calibration factor D and the quantitative value of the physically real or synthetic adjustment impedances provided in the attendant electrical network are established in terms of the relative thickness of the liner; the electrical characteristics of the liner; and the electrical characteristics of the metered fluid. It has been found that the dependence of the third factor mentioned above, namely, the electrical characteristics of the metered fluid, becomes negligible, provided $$\frac{1}{5(1+T)_8} \ll 1$$

where T is the relative thickness of the liner as already defined. This eighth power dependence is quite sharp. A practical commercial criterion is that the flowmeter calibration factor D should be insensitive to the electrical characteristics of the meter fluid to a tolerance not exceeding five percent. To achieve this, the liner relative thickness T should exceed a critical value $T_c$ as defined by $$\frac{1}{5(1+T_c)} 8 \simeq 0.05$$

or in other words, $T_c \approx 0.20$. A thick-walled liner is therefore defined as a liner on the interior of the flowmeter having a relative thickness of aproximately one-fifth or greater. It is preferable to operate with a relative liner thickness in excess of this critical value if greater accuracy is desired, even with the widest variations in electrical characteristics of the metered fluid.

Because of electronic noise considerations, it is desirable that the complex conductivity of the liner within a screened electromagnetic flowmeter be not much larger than, say, 5 or 10 times the complex conductivity of the metered fluid. A dielectric liner, preferably one with low relative permittivity, may therefore always be used regardless of whether the metered fluid is conductive or dielectric. Such dielectric liners (made of, say, Teflon or glass or alumina) have great chemical resistance and hence are particularly useful for the metering of corrosive fluids. When such a dielectric liner is employed, it is preferable to use an alternating magnetic induction B.

If the metered fluid has good electrical conductivity (e.g., if the metered fluid is a liquid metal) then the liner within a screened electromagnetic flowmeter may be made of either dielectric or conductive material. If a conductive liner is employed, then the magnetic induction B may be either steady or alternating. If a conductive liner is employed, one should be careful that the attendant electrical network can provide sufficient power so that the elements in the screen surface may be maintained at potentials which are a linear function of the two detecting electrode potentials.

The use of a thick-walled liner has advantages in that it may provide a very strong mechanical construction wherein the various electrodes could be mounted on the exterior surface of the liner so that it serves as the tubular means itself. The electrodes may be pressed up against or at least very near to this exterior surface and the material which insulates the high impedance detecting electrode from its associated outwardly disposed shield can be selected solely on the basis of its electrical characteristics and need not necessarily be of high mechanical strength. In some instances it may not be desirable to have the electrodes pressed into direct contact with the exterior surface of such a thick-walled liner. It may be preferable to separate the liner from the electrodes by another area of insulating medium. In particular, this additional thin area of insulating medium may consist of an air space or vacuum surrounding the liner and lying within the screen surface. This arrangement would be particularly well suited for cryogenic flowmeter applications, and would permit all of the electrodes and attendant connections to be located on a warm vacuum jacket which would serve as the mechanical support for the screen surface members.

Figure 14:
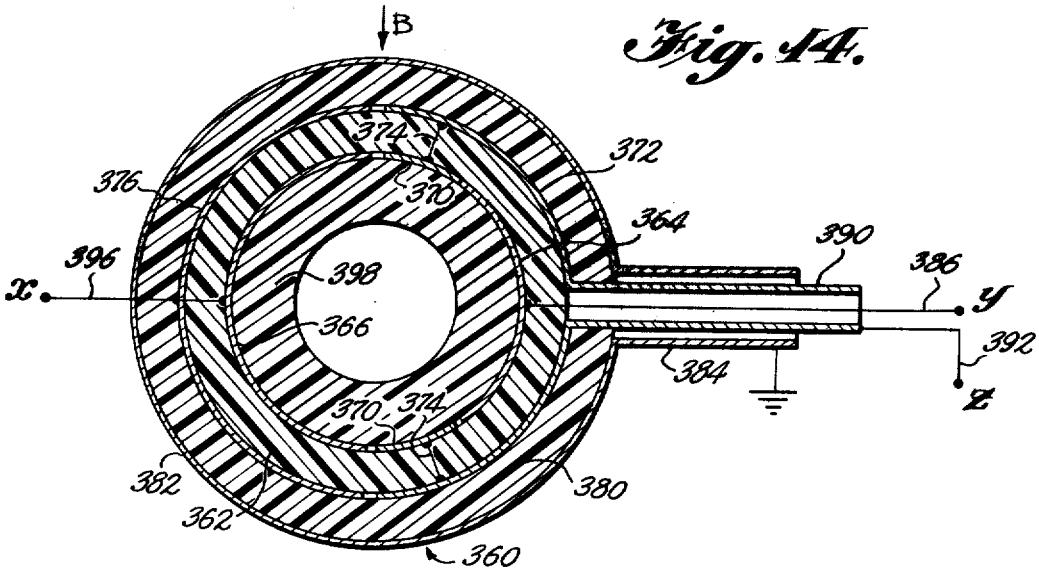
FIG. 14 is schematic illustration of still another modification of the present invention.

Referring now to FIG. 14, a cross-sectional view is provided of a thick-walled liner transducer arrangement. For simplicity of discussion, a single sided configuration is shown employing one low impedance detecting electrode and one high impedance detecting electrode with an attendant guard ring and shield means.

As seen in this figure, the transducer portion of the apparatus is indicated generally by reference numeral 360. The transducer portion includes a generally cylindrical tubular means 362 of dielectric material having the necessary dielectric and magnetic properties. A pair of detecting electrodes 364 and 366 are provided, electrodes 364 and 366 being separate and electrically insulated from one another and disposed preferably at diametrically opposite inner portions of member 362.

A guard ring 370 is also disposed on the inner surface of member 362, this guard ring being disposed in the same relative relationship to the high impedance detecting electrode as the guard ring previously described. A shield means 372 is disposed directly outwardly of the high impedance detecting electrode 364 and is connected with guard ring 370 by lead means 374. A second shield means 376 is provided in spaced insulated relationship to shield means 372, these shield means being formed of a suitable electrically conductive metallic substance such as copper or the like, and being sufficiently thin to minimize eddy currents. The detecting electrodes may, of course, be of the same construction.

Shield means 372 and 376 are mounted on the outer surface of member 362 and are in turn surrounded by a generally cylindrical member 380, which may be of suitable dielectric material similar to that of member 362.

Members 364, 366 and 370 of this modification define a screen surface as discussed hereinbefore.

It should be understood that the components hereindescribed in connection with FIG. 14 are associated with a suitable means for generating an alternating magnetic field similar to the arrangement shown in FIG. 2, this field being indicated schematically by the symbol B in FIG. 14.

Member 380 is surrounded by a ground means 382 in the form of an electrically conductive layer of material connected with the outer tubular member 384 of a triaxial transmission line, portion 384 being in turn connected with ground.

An electrical lead 386 connects the relatively high impedance detecting electrode 364 with a terminal y. This lead 386 is disposed coaxially within a tubular member 390 which in turn is connected with the shield means 372, tubular member 390 being connected by a lead 392, with a terminal z. A lead 396 connects the low impedance detecting electrode 366 with a terminal x.

It will be understood that in the transducer shown in FIG. 14, the flow of fluid is perpendicular to the plane of the figure, and that the alternating magnetic induction B is transverse to the axis of the tubular means through which the fluid flows. It will, of course, be understood that the arrangement may be so designed that the electrode configuration is symmetric for connection with a balanced or push-pull system.

A thick-walled liner 398 is disposed inwardly of the electrodes 364, 366 and 370, this liner having a relative thickness which is in excess of the critical value aforedescribed.

FIG. 2 illustrates a symmetric transducer arrangement which is intended to be connected to a symmetrical balanced associated electrical network having a symmetrical differential amplifier as its input. FIGS. 9, 11 and 14 illustrate single-sided transducer configurations which are intended to be connected to a single-sided associated electrical network. In FIGS. 9, 11 and 14, the low impedance detecting electrode is illustrated as having a connection terminal x. The high impedance detecting electrode of each of these figures is shown as having a connection terminal y, and the screen electrodes including the guard ring and associated shield means is shown as having a connection terminal z. Some of the screen electrodes may be operated at potentials other than those existing at the terminal z, and it is only necessary that the screen electrode immediately adjacent the high impedance detecting electrode be connected with the terminal z. For the purpose of illustration, it can be assumed that all of the screen electrodes are connected to terminal z.

FIGS. 15, 16, 17 and 18 show typical associated electrical networks which may be employed with any of the single-sided transducer configurations illustrated in FIGS. 9, 11 and 14. The electrical network shown in FIGS. 15 and 16 may be modified into a balanced arrangement suitable for use with the transducer means shown in FIG. 2. In all instances, the transducer connection terminals x, y and z are connected respectively with the terminals x′, y′ and z′ of the associated electrical networks which include active as well as passive elements.

Figure 15:
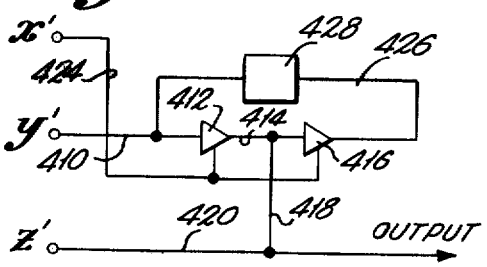
FIG. 15 illustrates a first typical attendant electrical network including an output circuit.

Referring now particularly to FIG. 15, terminal y′ is connected by lead 410 with the input of the first stage 412 of an amplifier means, the output of this first stage being connected by lead 414 with a second stage 416 of the amplifier means. The output of the first stage of the amplifier means is connected by lead 418 with a lead 420 which is in turn connected with terminal z′. Lead 420 is in turn connected with a suitable output means. The gain of the first stage 412 of the amplifier means is unity, and accordingly, the electrode means connected with terminal z′, including the guard rings and associated shield means, are driven at unit gain from the amplifier means so that substantially no potential difference due to flow generated voltage will exist between the high impedance detecting electrode in each case and the associated adjacent guard ring and shield means.

The terminal x is connected by means of lead 424 with the reference level connections of amplifier stages 412 and 416.

The output of the second stage 416 of the amplifier means is connected by lead 426 through an impedance means 428 to the input of the first stage 412 of the amplifier means. This arrangement provides a feedback path from the output of the amplifier means to the input thereof through a feedback impedance. With the impedance value and gain setting suitably established, the detected voltage is equal to the flow generated voltage and is independent of the electrical characteristics of the fluid.

Figure 16:
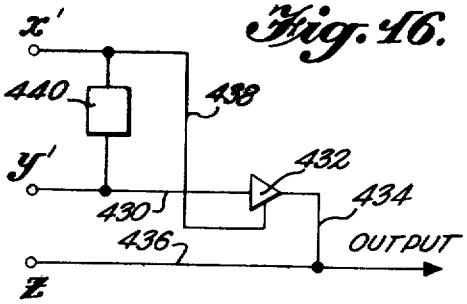
FIG. 16 illustrates a second typical attendant electrical network including an output circuit.

FIG. 16 illustrates the modification of the circuit shown in FIG. 15, and is of simpler construction for utilization in certain applications as hereinafter explained. In this circuit, the terminal y′ is connected by lead 430 with an amplifier 432 which corresponds to the first stage 412 of the circuit shown in FIG. 15. Here again, the gain of amplifier 432 is at or near unity. The output of amplifier 432 is connected by lead 434 with a lead 436 which in turn is connected with the terminal z′. Lead 436 is in turn connected with the output. Terminal x′ is connected by lead 438 with the reference level connection of amplifier 432. Impedance means 440 is connected between leads 430 and 438.

Figure 17:
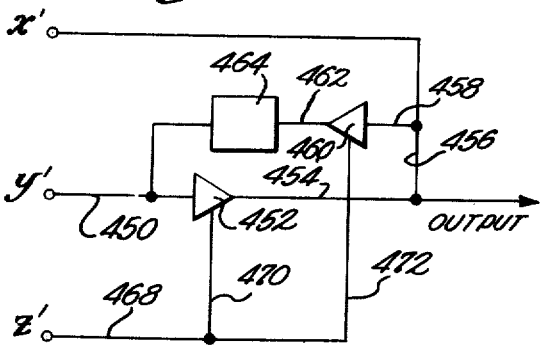
FIG. 17 illustrates a third typical attendant electrical network including an output circuit.

Referring now to FIG. 17, a further modified output circuit is provided wherein the terminal y′ is connected by lead 450 with the input of a first amplifier 452, the output of which is connected by lead 454 with a suitable output means. Lead 454 is also connected with a lead 456 which in turn is connected with terminal x′. With this interconnection, relatively large negative feedback is effectively provided to the relatively low impedance detecting electrode connected with terminal x′, thus driving the high impedance electrode toward zero potential or toward the same potential as its attendant guard ring and shield means.

Lead 456 is also connected by lead 458 with the input of a phase inverting amplifier 460, the output of which is connected with a lead 462 which is in turn connected to a feedback impedance 464 and with lead 450 as shown. This arrangement provides a regenerative feedback path from the output of amplifier 460 to the input of amplifier 452, through the feedback impedance 464 which may take the form of a high quality temperature stabilized capacitor.

The setting of the gain of amplifier 460 and the value of impedance 464 may be established in terms of flowmeter and amplifier circuit parameters which are entirely independent of the electrical properties of the metred fluid so that the detected voltage is proportional to the flow generated voltage and is independent of the electrical properties of the fluid.

Terminal z′ is connected by a lead 468 with leads 470 and 472 which are connected with the reference level connections of amplifiers 452 and 460 respectively.

Figure 18:
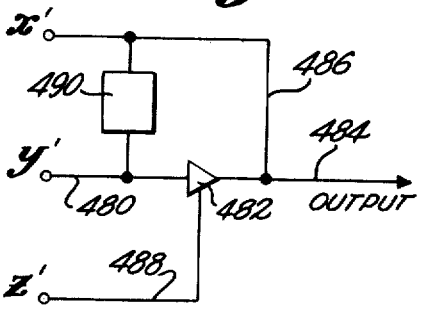
FIG. 18 illustrates still another typical attendant electrical network including an output circuit.

Referring now to FIG. 18, a simpler form of the circuit shown in FIG. 17 is illustrated wherein the terminal y′ is connected by lead 480 with the input of amplifier 482, the output of which is connected by lead 484 with a suitable output means. Lead 484 is in turn connected with a lead 486, which is connected with the terminal x′. A lead 488 connects the terminal z′ with the reference level connection of amplifier 482. An impedance 490 is connected between leads 480 and 486.

In each of the various output circuits, one of the objectives of the network and its connection to the associated electrodes is to maintain a substantially zero potential difference between the high impedance detecting electrode and its associated portion of the adjacent screen surface. This associated portion of the screen surface may take the form of a guard ring, a shield means, or a combination of guard ring and shield means in various configurations of the invention. In a flowmeter transducer according to the present invention incorporating a screen surface and either having no liner or a very thin liner therewithin, it has been found that a certain magnitude of adjustment capacitance must be connected between the terminals x′ and y′ in order that the flowmeter calibration factor D may be insensitive to the electrical characteristics of the metered fluid. If the flowmeter is to read in terms of mass flow rate for non-polar fluids, the required magnitude of adjustment capacitance is a positive real number, and hence a natural or structural capacitor may be connected between the terminals x′ and y′. However, if such a flowmeter is to read in terms of volumetric flow rate, the magnitude of the required adjustment capacitance is a negative real number. In other words, a capacitance of this type is not physically realizable as a natural or structural element, but must be synthesized by electronic artifice. For example, in the electrical network shown in FIG. 15, if the feedback impedance 42B is simply a capacitor $C_f$, then the synthetic capacitance between terminals x′ and y′ is $(1-A_1A_2)C_f$, and it will be noted that this capacitance will be negative provided the product of amplifier gains $A_1A_2$, which represents the gains of amplifiers 412 and 416 respectively, is positive and sufficiently large.

There is an appreciable capacitance, or more generally a susceptance, between the high impedance detecting electrode and its attendant guard ring and shield means. If this capacitance is called $C_s$, then it contributes a synthetic capacitance, as described above, in the amount of $(1-A_1)C_s$. Occasionally, the quality of the capacitance $C_s$ is such that it may be relied upon to be stable, and hence the gain $A_1$ of amplifier 412 as shown in FIG. 15 may be set different from unity so that the required adjustment capacity is achieved without need for elements 416 and 428 as shown in this figure.

Generally, it is unwise to make use of this synthetic capacitance because the natural or physical capacitance $C_s$ by itself cannot always be relied upon to be temperature stable or have adequately low dissipation factor. Accordingly, it is generally advisable to set the amplifier gain $A_1$ equal to unity so that this synthetic capictance remains zero, and ineffective, even though $C_s$ itself should drift or change considerably.

In the typical output circuit shown in FIG. 17, the synthetic capacitance between terminals x′ and y′ is given by $(1-A_1A_2)C_f/(1-A_1)$, and since in practice the gain $A_1$ is very large and negative, this effectively amounts to $A_2C_f$. Therefore, a synthetic negative capacitance is generated whenever amplifier 460 has a negative gain.

Whenever the required adjustment capacitance is negative, it is generated synthetically by electrical networks as shown for example in FIGS. 15 and 17. When the required adjustment capacitance is positive, as for example in the flowmeter according to the present invention which has no liner and is intended to measure mass flow of nonpolar fluids, the circuits shown in FIGS. 16 and 18 may be employed where the impedances 440 and 490 respectively are natural or structural capacitors of the required magnitude connected between the terminals x′ and y′.

In a flowmeter according to the present invention having no liner or a relatively thin liner, the required adjustment impedance is purely capacitive and may be a positive physically realizable capacitance if the instrument is to measure mass flow rate or a negative synthesized capacitance if the instrument is to read in terms of volumetric flow rate.

When a purely dielectric liner having negligible loss tangent or dissipation factor is employed with a purely dielectric fluid, the required adjustment is still purely capacitive.

The quantitative value of this physically read and/or synthetic capacitance is established in terms of the relative thickness of the liner; the relative permittivity of the liner; and the relative permittivity of the metered fluid. When the proper value of the physically real and/or synthetic adjustment capacitance is provided, the flowmeter's calibration factor D is insensitive to small variations in electrical characteristics of the metered fluid. A certain predetermined value of adjustment capacitance will yield a volumetric flow rate indication, and a second predetermined adjustment capacitance will yield a mass flow rate indication, particularly suitable for non-polar fluids.

If the liner and/or the metered fluid within the screened electromagnetic flowmeter are not pure dielectrics, as when the complex conductivity S includes an appreciable portion of real conductivity $\sigma$, then the required physically real and/or synthetic adjustment impedance to be provided between terminals x' and y' will not, in general, be purely capacitive in order that the flowmeter operates so as to be insensitive to small variations in electrical characteristics of the metered fluid.

If the required adjustment impedance is physically realizable, then that impedance is simply inserted directly as shown in FIGS. 16 and 18. If the required impedance is not physically realizable, then the required impedance may be synthesized by circuits such as shown in FIGS. 15 and 17 where the developed synthetic impedance is given by $Z_f/(1-A_1A_2)$ for the electrical network shown in FIG. 15, and is given by $Z_f(1-A_1)/(1-A_1A_2)$, or effectively by $Z_f/A_2$ for the network shown in FIG. 17, where it is assumed that the gain $A_1$ is very large and negative.

Therefore, the required synthetic adjustment impedance can be generated by designing the amplifiers of the circuits as well as the physically realizable impedance means to have the required values.

If a relatively thick-walled liner is employed as defined above, the required adjustment impedance becomes effectively independent of the electrical characteristics of the metered fluid. A predetermined value of adjustment impedance, either physically real and/or synthetic, will enable volumetric flow measurement; and a second certain predetermined value of adjustment impedance will enable mass flow measurement, particularly suitable for non-polar fluids. When such a thick-walled flowmeter according to the present invention is respectively adjusted for either the mass-metric mode or the volumetric mode, its calibration factor D is effectively independent of the electrical characteristics of the metered fluid, and accordingly the instrument is insensitive to variation in electrical characteristics of the metered fluid.

It is apparent from the foregoing that there is provided according to the present invention a new and novel electromagnetic flowmeter which can be effectively employed equally as well with both electrically conductive and dielectric metered fluids. The flowmeter's calibration factor is substantially independent of the electrical characteristics of the material outwardly of the screen surface provided in each of the various modifications of the invention. The flowmeter is also substantially insensitive to electrical characteristics of the metered fluid either when no liner is provided (or when an extremely thin liner is provided) or further wherein a so-called thick-walled liner is provided. The flowmeter of the present invention is quite simple and inexpensive in construction, has a small volume and is lightweight, and at the same time is quite effective and reliable in operation.

I claim:

1. Magnetic flowmeter apparatus comprising a tubular means having a longitudinal axis and through which fluid is adapted to flow, means for producing a magnetic field within said tubular means, electrode means adjacent said tubular means within said magnetic field and extending longitudinally of said tubular means, an electrical network electrically connected with said electrode means, said electrode means including detecting electrode means comprising at least two separate detecting electrodes electrically insulated from one another for detecting electrical signals in the fluid flowing through said tubular means, at least one of said detecting electrodes being a relatively high impedance electrode, said electrode means also including screen electrode means, a screen surface comprising said screen electrode means and said high impedance detecting electrode means, said screen surface extending in surrounding spaced relation to said axis, said surface being substantially closed peripherally thereof and including a plurality of electrically non-conductive gaps of only minor peripherally extending dimension sufficient to insulate certain portions of the screen surface from one another, said electrical network including means for establishing on each electrode means of said screen surface an electrical potential which is a linear function of the electrical potential on said detecting electrodes [the portion of the screen surface adjacent said relatively high impedance electrode being at substantially the same flow generated electrical potential as said relatively high impedance electrode].

2. Apparatus as defined in claim 1, a portion of said screen surface being disposed upstream of said relatively high impedance electrode and a portion of said screen surface being disposed downstream of said relatively high impedance electrode.

3. Apparatus as defined in claim 1, the portion of said screen surface which is substantially longitudinally coextensive with said relatively high impedance electrode defining a portion of the fluid flow path through the flowmeter and being in direct contact with fluid passing through the flowmeter.

4. Apparatus as defined in claim 1, wherein a portion of said screen surface is disposed upstream of said relatively high impedance electrode, a portion of said screen surface being disposed downstream of said relatively high impedance electrode, the portion of said screen surface which is substantially longitudinally coextensive with said relatively high impedance electrode defining a portion of the fluid flow path through the flowmeter and being in direct contact with fluid passing through the flowmeter.

5. Apparatus as defined in claim 1, said tubular means being disposed inwardly of said screen surface so that no portion of the fluid flowing through the flowmeter comes in contact with the portion of the screen surface which is substantially longitudinally coextensive with said relatively high impedance electrode.

6. Apparatus as defined in claim 5, wherein a portion of said screen surface is disposed upstream of said relatively high impedance electrode, and a portion of said screen surface is disposed downstream of said relatively high impedance electrode.

7. Apparatus as defined in claim 5, wherein said tubular means is formed of dielectric material.

8. Apparatus as defined in claim 7, wherein a portion of said screen surface is disposed upstream of said relatively high impedance electrode, and a portion of said screen surface is disposed downstream of said relatively high impedance electrode.

9. Apparatus as defined in claim 5, wherein the thickness of said tubular means is greater than 20 percent of the internal radius thereof.

10. Apparatus as defined in claim 9, wherein a portion of said screen surface is disposed upstream of said relatively high impedance electrode, and a portion of said screen surface is disposed downstream of said relatively high impedance electrode.

11. Apparatus as defined in claim 9, wherein said tubular means is formed of dielectric material.

12. Apparatus as defined in claim 11, wherein a portion of said screen surface is disposed upstream of said relatively high impedance electrode, and a portion of said screen surface is disposed downstream of said relatively high impedance electrode.

13. Apparatus as defined in claim 1, liner means disposed inwardly of said screen surface so that no portion of the fluid flowing through the flowmeter comes in contact with the portion of the screen surface which is substantially longitudinally coextensive with said relatively high impedance electrode, said tubular means being disposed outwardly of said screen surface.

14. Apparatus as defined in claim 13, wherein a portion of said screen surface is disposed upstream of said relatively high impedance electrode, and a portion of said screen surface is disposed downstream of said relatively high impedance electrode.

15. Apparatus as defined in claim 13, wherein said liner means is formed of dielectric material.

16. Apparatus as defined in claim 15, wherein a portion of said screen surface is disposed upstream of said relatively high impedance electrode, and a portion of said screen surface is disposed downstream of said relatively high impedance electrode.

17. Apparatus as defined in claim 13, wherein the thickness of said liner means is greater than 20 percent of the internal radius thereof.

18. Apparatus as defined in claim 17, wherein a portion of said screen surface is disposed upstream of said relatively high impedance electrode, and a portion of said screen surface is disposed downstream of said relatively high impedance electrode.

19. Apparatus as defined in claim 17, wherein said liner means is formed of dielectric material.

20. Apparatus as defined in claim 19, wherein a portion of said screen surface is disposed upstream of said relatively high impedance electrode, and a portion of said screen surface is disposed downstream of said relatively high impedance electrode.

*21. Apparatus as defined in claim 1, wherein the portion of the screen surface adjacent said relatively high impedance electrode being at substantially the same flow generated electrical potential as said relatively high impedance electrode.*

References Cited

The following references, cited by the Examiner, are of record in the patented file of this patent or the original patent.

UNITED STATES PATENTS

| | | | |
|---|---|---|---|
| 2,733,604 | 2/1956 | Coulter | 73—194 |
| 3,274,831 | 9/1966 | Cushing | 73—194 |

CHARLES A. RUEHL, Primary Examiner